United States Patent [19]

Meyer et al.

[11] Patent Number: 5,687,192

[45] Date of Patent: Nov. 11, 1997

[54] CIRCUIT ARRANGEMENT FOR TRANSMITTING INFORMATION ON A TWO-WIRE LINE

[75] Inventors: Dieter Meyer, Feucht; Klaus Krockenberger, Stein; Dieter Faber, Reichenschwand, all of Germany

[73] Assignee: Robert Bosch GmbH, Stuttgart, Germany

[21] Appl. No.: 311,377

[22] Filed: Sep. 23, 1994

[30] Foreign Application Priority Data

Sep. 30, 1993 [DE] Germany .............. 43 33 358.3

[51] Int. Cl.$^6$ .............. H04L 27/00; H04L 25/00
[52] U.S. Cl. .............. 375/259; 375/257
[58] Field of Search .............. 375/22, 36, 238, 375/257, 295, 296, 300, 259, 237, 239; 327/291, 103, 130, 31, 34, 35; 341/189, 143; 329/312

[56] References Cited

U.S. PATENT DOCUMENTS

| | | | |
|---|---|---|---|
| 4,254,403 | 3/1981 | Perez-Cavero | 340/310 |
| 4,353,123 | 10/1982 | Rost | 367/137 |
| 4,399,564 | 8/1983 | Cowen | 375/22 |
| 4,408,185 | 10/1983 | Rasmussen | 340/310 |
| 4,419,021 | 12/1983 | Terada | 374/101 |
| 4,896,333 | 1/1990 | Can | 375/257 |
| 4,995,054 | 2/1991 | Eckersley | 375/36 |
| 5,088,112 | 2/1992 | Pyhälammi | 375/36 |
| 5,249,201 | 9/1993 | Posner et al. | 375/295 |
| 5,264,823 | 11/1993 | Stevens | 375/259 |

FOREIGN PATENT DOCUMENTS

| | | |
|---|---|---|
| 2 083 301 | 3/1982 | United Kingdom . |
| WO 92/06552 | 4/1992 | WIPO . |

*Primary Examiner*—Curtis Kuntz
*Assistant Examiner*—Vijay Shankar
*Attorney, Agent, or Firm*—Kenyon & Kenyon

[57] ABSTRACT

In a two-wire line between a transmitter and a receiver, voltage or current pulses are used to transmit information, the content of which is contained in the period duration. This is achieved in that a transmitter connects or disconnects the operating voltage for a receiver using a switch. It is not necessary to have a digital-analog conversion or the reverse. Furthermore, a high pulse-duty factor is used, so that the supplying of the receiver is always guaranteed.

11 Claims, 1 Drawing Sheet

5,687,192

CIRCUIT ARRANGEMENT FOR TRANSMITTING INFORMATION ON A TWO-WIRE LINE

FIELD OF THE INVENTION

The present invention relates to a circuit arrangement for transmitting information on a two-wire line between a transmitter and receiver.

BACKGROUND OF THE INVENTION

A circuit arrangement for transmitting a supply voltage and a control signal, in which the power output element of a solenoid valve is triggered via a double-conductor cable, is described in German Patent No. DE 37 17 260. On the transmission end, a microcomputer converts a digital control signal for the power output element by means of pulse-width modulation into an a.c. voltage, which is transmitted to the power output element. On the receiving end, a rectifier, which extracts the operating voltage for the power output element from the a.c. voltage, is connected to the power output element. This is not a favorable solution, because the initially available digital signal is converted prior to the transmission into an analog signal. After the transmission, it is converted back into a digital signal, to allow the solenoid valve to be digitally triggered.

SUMMARY OF THE INVENTION

An advantage of the circuit arrangement according to the present invention is that no digital/analog conversion is necessary, but rather the control information can be drawn directly from the period duration, or rather from its frequency. Another advantage is that a very simple circuit arrangement is achieved, since briefly interrupting the operating voltage being applied to the two-wire line allows the information to be generated using a simple semiconductor switch. In addition, the large pulse duty factor has the advantage that considerable energy can be transferred via the two-wire line, without the connected consumer being disturbed by the short-term interruption of the operating voltage. Furthermore, since only d.c.-voltage or d.c.-current pulses are transmitted, for the most part one can use conventional integrated circuits, which place no especially high demands on blocking protection. As a result, an inexpensive circuit design is advantageously attained.

If only one parameter is changed and the other parameters remain constant, the information can be easily coded and decoded.

Because the pulse duty factor is ≧50%, sufficient energy for controlling the connected receiver or other device can also be advantageously made available, so that one does not have to expect a power surge or loss of data.

Since microprocessors are commercially available in large, inexpensive quantities, they can be used, particularly in conjunction with a semiconductor switch, to make a simple coding device. Microprocessors can be easily programmed, so that programming changes are facilitated.

Decoding on the receiver side by means of a microprocessor also yields the advantage that by making use of the integrated time functions, the decoding of the information also becomes very simple. A connected display device can, for example, still be easily triggered in the same way by the microprocessor.

DETAILED DESCRIPTION

Figure 1:
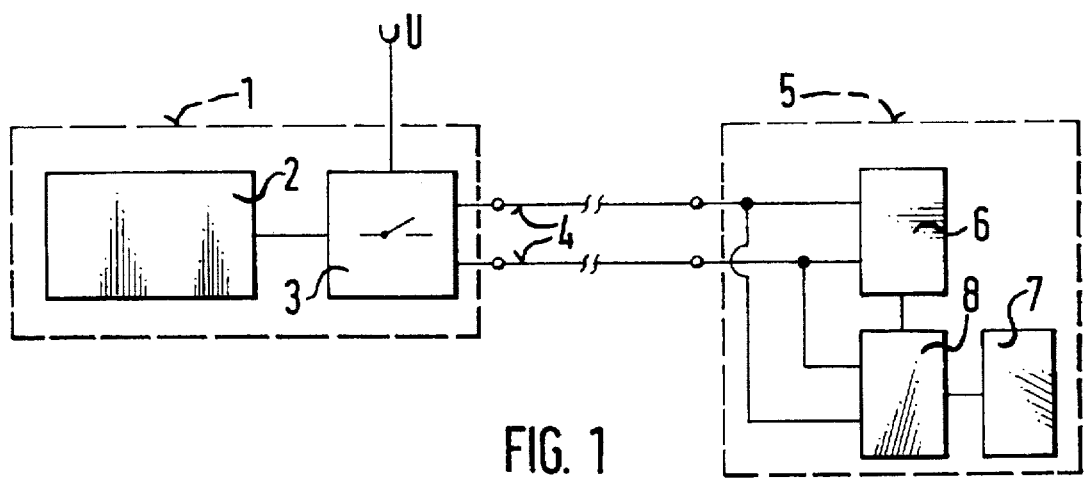
FIG. 1 depicts a block diagram of the circuit arrangement according to the present invention.

Referring to FIG. 1, there is shown a transmitter 1, which is connected via a two-wire line 4 to a remotely situated receiver 5. The two-wire line 4 can be designed, as needed, with respect to the information to be transmitted. For example, it is possible to shield or twist the two-wire line to shield it from outside influences. The transmitter 1 contains a controller 2, which is preferably designed using a microprocessor. The controller 2 is connected to a switch 3, which, for example, can be a bipolar transistor or a field-effect transistor (FET). The switch 3 is triggered by the control output of the controller 2, so that it connects or disconnects the operating voltage U.

The receiver 5 has a voltage-stabilizing circuit 6, whose inputs are connected to the two-wire line 4. Connected in parallel to the incoming two-wire line 4 is a decoder 8, which decodes the information transmitted as pulsed voltage or current pulses and delivers it to control-inputs of a display 7.

The functioning of this circuit arrangement is described with reference to FIGS. 2 and 3.

Figure 2:
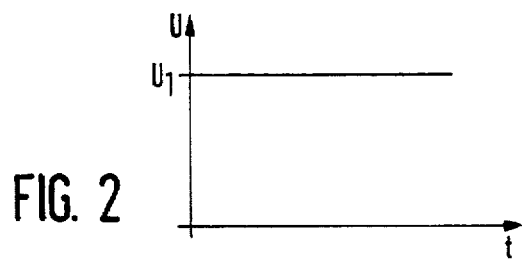
FIG. 2 shows a first voltage diagram according to the present invention when no information is being transmitted.

Referring now to FIG. 2, there is shown a voltage diagram, whose voltage characteristic can be measured at the two-wire line 4. During normal operation, when no information is being transmitted, the voltage is measured as a constant voltage $U_1$ on the two-wire line 4.

Figure 3:
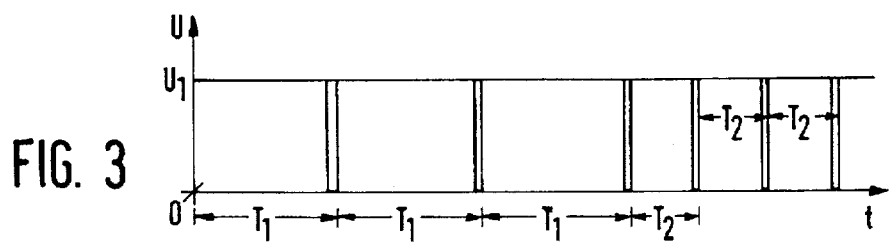
FIG. 3 shows a second voltage diagram according to the present invention when information is being transmitted.

Referring now to FIG. 3, there is shown a voltage diagram of normal operation when information is being transmitted by the transmitter 1. The voltage U is likewise plotted over time t. However, the voltage U is no longer a constant voltage $U_1$, but rather is briefly interrupted for short periods of time. A period duration T (frequency) results for each pulse and each interval. In accordance with the exemplified embodiment of FIG. 3, various period durations (frequencies) may be transmitted (for example, $T_1$, $T_2$), depending on the information. On the transmitting and the receiving sides, the coding is performed for the corresponding period duration (frequency), for example, in accordance with table 1. A specific function of the display may be controlled in this case depending upon the period duration T. Table 1 reveals that when T=5.0 ms, segment 1 of the display is switched on. When T=4.9 ms, segments 1 and 2 of the display are switched on, etc.

TABLE 1

| T/ms | Function |
|------|----------|
| 5.0 | segment 1 on |
| 4.9 | segment 1, 2 on |
| 4.8 | segment 1, 2, 3 on |
| 4.7 | segment 1, 2, 3, 4 on |

The period duration is determined by the microprocessor which has a free-running counter that counts up with a fixed time cycle.

If, for example, an external event is occurring, such as a high-low edge transition at the input port, the current counter value is retained. If a signal is applied to the input port, as shown in FIG. 3, then all counter values, which are reached at the respective high-low edge, are retained. By formulating the difference between two adjacent counter values, one can then calculate the frequency f according to the formula f=1/T, where T=the period duration.

To increase transmission reliability, the same period duration should be transmitted at least three times. If all differential values are the same, then the appropriate action can be initiated, such as energizing a display or a loudspeaker. For example, the control 2 controls the switch 3 with the period duration T. In this case, the operating voltage U is applied as connected and disconnected voltage to the two-wire line 4. The receiver 5 generates its operating voltage, together with the voltage-stabilizing circuit 6, so that the display 7, and/or another connected device, receives a constant voltage.

As a decoder 8, for example, one can use a microprocessor. With the help of the microprocessor's integrated time functions, for example, one can determine the period duration T, or the frequency f.

In the same way, with the help of the microprocessor, one can trigger a display, such as a liquid crystal display (LCD) liquid or crystal display, and/or a signal transmitter, such as a loudspeaker, and in this manner, output an optical and/or acoustic signal.

What is claimed is:

1. A circuit arrangement, comprising:

a transmitter;

a receiver;

a two-wire line coupled to said transmitter and said receiver;

said transmitter including means for generating one of voltage pulses and current pulses by one of connecting and disconnecting an operating voltage, said one of the voltage pulses and current pulses used to code information using a preselected pulse-duty factor and to transmit said information to said receiver via said two-wire line;

said receiver generating the operating voltage from said one of the voltage pulses and current pulses, and decoding information.

2. The circuit arrangement according to claim 1, wherein said information is coded by varying the pulse-duty factor.

3. The circuit arrangement according to claim 2, wherein the means for generating said one of the voltage pulses and current pulses keeps the pulse-duty factor constant independently of said information.

4. The circuit arrangement according to claim 2, wherein the pulse-duty factor $\geq 50\%$.

5. The circuit arrangement according to claim 2, wherein the means for generating said one of the voltage pulses and current pulses includes a controller and a switch, said controller changing the operating voltage for coding said information by controlling said switch.

6. The circuit arrangement according to claim 5, wherein said controller includes a microprocessor.

7. The circuit arrangement according to claim 5, wherein said switch is a semiconductor switch.

8. The circuit arrangement according to claim 1, wherein said receiver includes means for generating the operating voltage, and a decoder for decoding said information.

9. The circuit arrangement according to claim 8, wherein the means for generating the operating voltage includes a stabilizer.

10. The circuit arrangement according to claim 8, wherein the means for generating the operating voltage includes a controller.

11. The circuit arrangement according to claim 8, wherein said decoder includes a microprocessor, said microprocessor being coupled to the two-wire line for controlling a timing function.

* * * * *